UNITED STATES PATENT OFFICE.

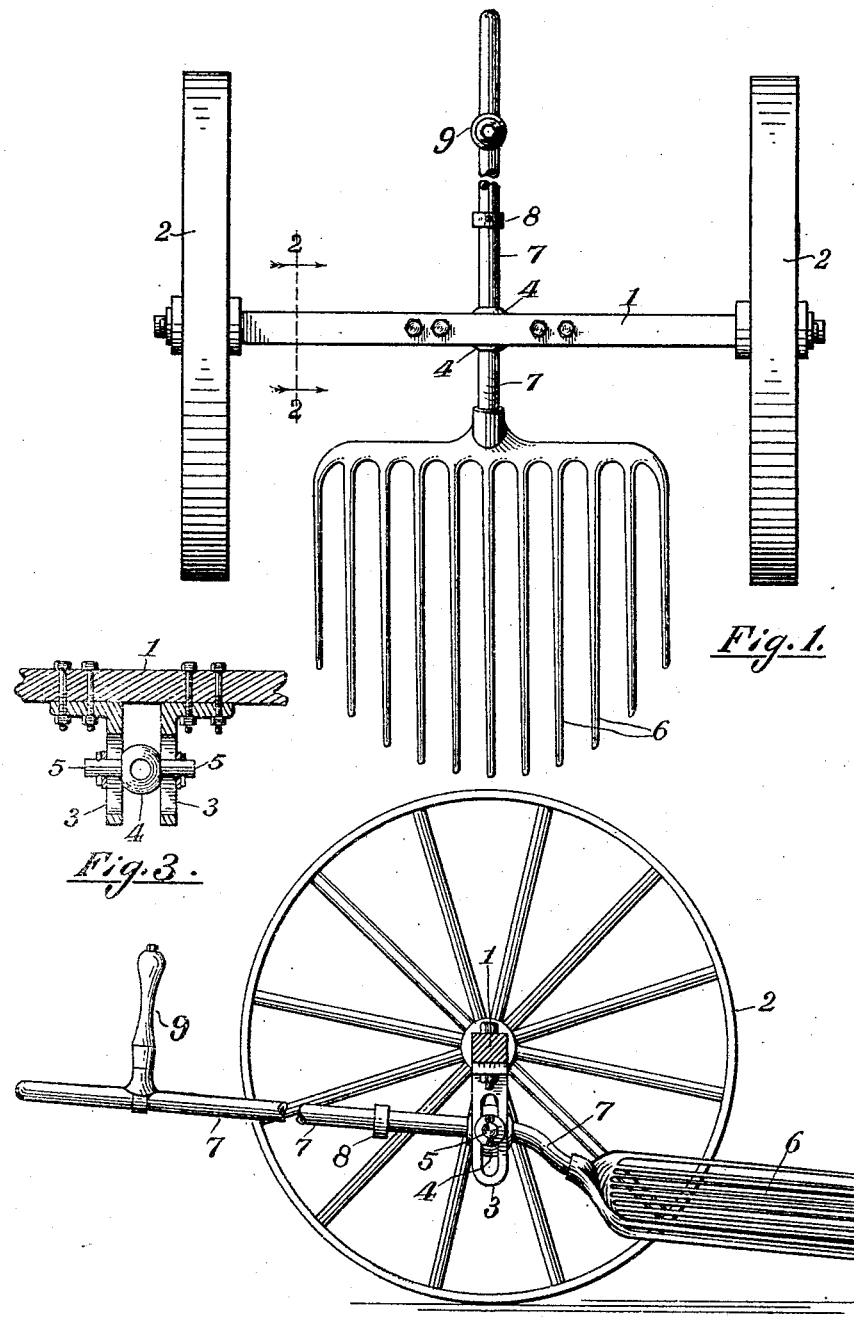
W. H. BEARINGER.
POTATO DIGGER.
APPLICATION FILED APR. 28, 1908.
909,521.
Patented Jan. 12, 1909.

WILLIAM H. BEARINGER, OF MACKINAW, MICHIGAN.

POTATO-DIGGER.

No. 909,521.  Specification of Letters Patent.  Patented Jan. 12, 1909.

Application filed April 28, 1908. Serial No. 429,650.

*To all whom it may concern:*

Be it known that I, WILLIAM H. BEARINGER, a citizen of the United States of America, residing at Mackinaw city, in the county of Cheboygan and State of Michigan, have invented certain new and useful Improvements in Potato-Diggers; and I do hereby declare the following to be a full, clear, and exact description of the invention, such as will enable others skilled in the art to which it appertains to make and use the same.

My invention relates to improvements in potato diggers, and more particularly to manually operated devices for the purpose, and its object is to provide the same with more effective means for operating the same, and to provide the device with various new and useful features as hereinafter more fully described and particularly pointed out in the claims, reference being had to the accompanying drawings, in which:

Figure 1. is a plan view of a device embodying my invention; Fig. 2. a side elevation of the same with one wheel and a part of the axle removed; and, Fig. 3. a detail of the pivot mechanism for the lever.

Like numbers refer to like parts in all of the figures.

1 represents an axle, 2 wheels mounted thereon and adapted to traverse the ground at the respective sides of the rows of potatoes to be dug. Depending from near the middle of the axle are hangers 3 preferably slotted vertically to permit of varying the angle of inclination of the handle to the soil, between which hangers is mounted a sleeve 4 having journals 5 extending through the hangers 3 and both slidable and rotative therein. 6 is a large fork adapted for penetrating the soil and removing the potatoes therefrom. This fork is mounted on a lever 7, which lever extends through the sleeve 4 and is slidable longitudinally therein. 8 is a collar on the lever to limit its movement in the sleeve.

9 is a laterally projecting handle on the lever to assist in operating the device and particularly to determine the rotative adjustment of the lever 7 in the sleeve. This handle is preferably adjustable on the lever.

From the foregoing description, the operation of my device will be readily understood. The sleeve serves as a fulcrum for the lever 7, whereby when the fork is thrust into the soil, the lever will more effectively serve to lift the soil and potatoes. The axle and wheels support the fulcrum and carry the device from place to place. So also soil, or any other material supported upon the fork may be readily moved about as upon a cart by means of these wheels and axles, and the fork may be held in horizontal position and may be turned for dumping the contents thereof as occasion may require by means of the handle 9. The device is therefore applicable to various other uses besides digging potatoes, such as lifting and transporting various articles or material.

What I claim is:

1. The combination of an axle, wheels on the axle, hangers attached to the axle and provided with vertical slots, a sleeve between the hangers vertically movable and journaled in the slots, a lever slidable in the sleeve and oppositely projecting therefrom, a fork on one end of the lever and an adjustable handle on the other end of the lever.

2. The combination of an axle, wheels on the axle, a hanger supported by the axle, a sleeve pivoted in the hanger and vertically movable therein, a lever slidable in the sleeve, a fork on one end of the lever, a laterally projecting handle near the other end of the lever and adjustable longitudinally thereof and a collar on the lever between the handle and the sleeve.

In testimony whereof I affix my signature in presence of two witnesses.

WILLIAM H. BEARINGER.

Witnesses:
W. H. BEARINGER, Jr.,
JAMES IRVING.